US009388722B2

(12) United States Patent
Gonze et al.

(10) Patent No.: US 9,388,722 B2
(45) Date of Patent: Jul. 12, 2016

(54) VOLTAGE CONTROL SYSTEM FOR HEATING A SELECTIVE CATALYST REDUCTION DEVICE

(71) Applicant: GM GLOBAL TECHNOLOGY OPERATIONS LLC, Detroit, MI (US)

(72) Inventors: Eugene V. Gonze, Pinckney, MI (US); Michael J. Paratore, Jr., Howell, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 13/910,676

(22) Filed: Jun. 5, 2013

(65) Prior Publication Data

US 2014/0360162 A1   Dec. 11, 2014

(51) Int. Cl.
*F01N 3/18* (2006.01)
*F01N 3/20* (2006.01)
*F01N 9/00* (2006.01)
*F01N 13/00* (2010.01)

(52) U.S. Cl.
CPC ............ *F01N 3/2013* (2013.01); *F01N 3/2066* (2013.01); *F01N 9/00* (2013.01); *F01N 13/009* (2014.06); *F01N 2240/16* (2013.01); *Y02T 10/24* (2013.01); *Y02T 10/26* (2013.01); *Y02T 10/47* (2013.01)

(58) Field of Classification Search
CPC . F01N 13/02; F01N 2610/03; F01N 2610/02; F01N 3/2066
See application file for complete search history.

(56) References Cited

U.S. PATENT DOCUMENTS

| 5,388,404 A * | 2/1995 | Tsumura ........................ 60/284 |
| 5,444,976 A * | 8/1995 | Gonze .................. F01N 3/2013 60/274 |
| 2012/0060471 A1* | 3/2012 | Gonze et al. ..................... 60/274 |

* cited by examiner

*Primary Examiner* — Kenneth Bomberg
*Assistant Examiner* — Brandon Lee
(74) *Attorney, Agent, or Firm* — Cantor Colburn LLP

(57) ABSTRACT

An exhaust gas treatment system for an internal combustion engine is provided. The exhaust gas treatment system includes an electrically heated catalyst ("EHC") device in fluid communication with an exhaust gas conduit, a generator, a selective catalytic reduction ("SCR") device, and a control module. The EHC device includes an electric heater and an EHC catalyst that is heated to an EHC light-off temperature. The generator is selectively operable in a target voltage mode to supply a target voltage to the electric heater. The target voltage represents a voltage required by the electric heater in order to maintain the EHC catalyst at a catalyst temperature. The SCR device is in fluid communication with the exhaust gas conduit. The SCR device is located downstream of the EHC device and includes an SCR catalyst that is selectively heated by the EHC device to a SCR light-off temperature.

16 Claims, 2 Drawing Sheets

VOLTAGE CONTROL SYSTEM FOR HEATING A SELECTIVE CATALYST REDUCTION DEVICE

FIELD OF THE INVENTION

Exemplary embodiments of the invention relate to exhaust gas treatment systems for internal combustion engines and, more particularly, to an exhaust gas treatment system that includes an electrically heated catalyst ("EHC") device having a selectively activated catalyst maintained at a catalyst temperature.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system to convert certain, or all of these exhaust constituents into non-regulated exhaust gas components.

One type of exhaust treatment technology for reducing CO and HC emissions is an oxidation catalyst ("OC") device. The OC device includes a flow-through substrate with a catalyst compound applied to the substrate. The catalyst compound of the OC device induces an oxidation reaction of the exhaust gases once the OC device has attained a threshold or light-off temperature. One type of exhaust treatment technology for reducing $NO_x$ emissions is a selective catalyst reduction ("SCR") device. The SCR device includes a substrate, where a SCR catalyst compound is applied to the substrate. A reductant is typically sprayed into hot exhaust gases upstream of the SCR device. However, the SCR device also needs to reach a threshold or light-off temperature to effectively reduce $NO_x$. Following a cold start of the engine, the OC device and the SCR device have not attained the respective light-off temperatures, and therefore generally may not effectively remove CO, HC, and $NO_x$ from the exhaust gases.

One approach for increasing the effectiveness of the OC and the SCR devices involves providing an electrically heated oxidation catalyst ("EHC") device upstream of the OC device and the SCR device. The EHC device may include a monolith and an electrical heater. The catalyst of the EHC device is heated to a respective light-off temperature, which is the temperature at which rapid HC oxidation occurs within the oxidation catalyst compound disposed on the EHC device.

A generator may be provided to convert mechanical energy from the engine into electrical power needed for various electrical loads. In one approach, the generator may be disconnected from a vehicle battery while providing electrical power to the electrical heater of the EHC device to heat the catalyst of the EHC device. However, disconnecting the generator from the vehicle battery for an extended period of time reduces battery life. Accordingly, it is desirable to provide an approach for effectively providing electrical power to the electrical heater of the EHC device while reducing the impact on battery life.

SUMMARY OF THE INVENTION

In one exemplary embodiment of the invention, an exhaust gas treatment system for an internal combustion engine is provided, and includes an exhaust gas conduit, an electrically heated catalyst ("EHC") device, a generator, a selective catalytic reduction ("SCR") device, and a control module. The exhaust gas conduit is in fluid communication with, and configured to receive an exhaust gas from the internal combustion engine. The EHC device in fluid communication with the exhaust gas conduit, and includes an electric heater and an EHC catalyst that is heated to an EHC light-off temperature. The generator is selectively operable in a target voltage mode to supply a target voltage to the electric heater. The target voltage represents a voltage required by the electric heater in order to maintain the EHC catalyst at a catalyst temperature. The SCR device is in fluid communication with the exhaust gas conduit. The SCR device is located downstream of the EHC device and includes an SCR catalyst that is selectively heated by the EHC device to a SCR light-off temperature. The control module is in communication with the generator, the EHC device, and the SCR device. The control module is configured to determine if the EHC catalyst is above the EHC light-off temperature and if the SCR catalyst is below the SCR light off temperature. The control module is further configured to control the generator to operate at the target voltage mode if the EHC catalyst is above the EHC light-off temperature and the SCR catalyst is below the SCR light off temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
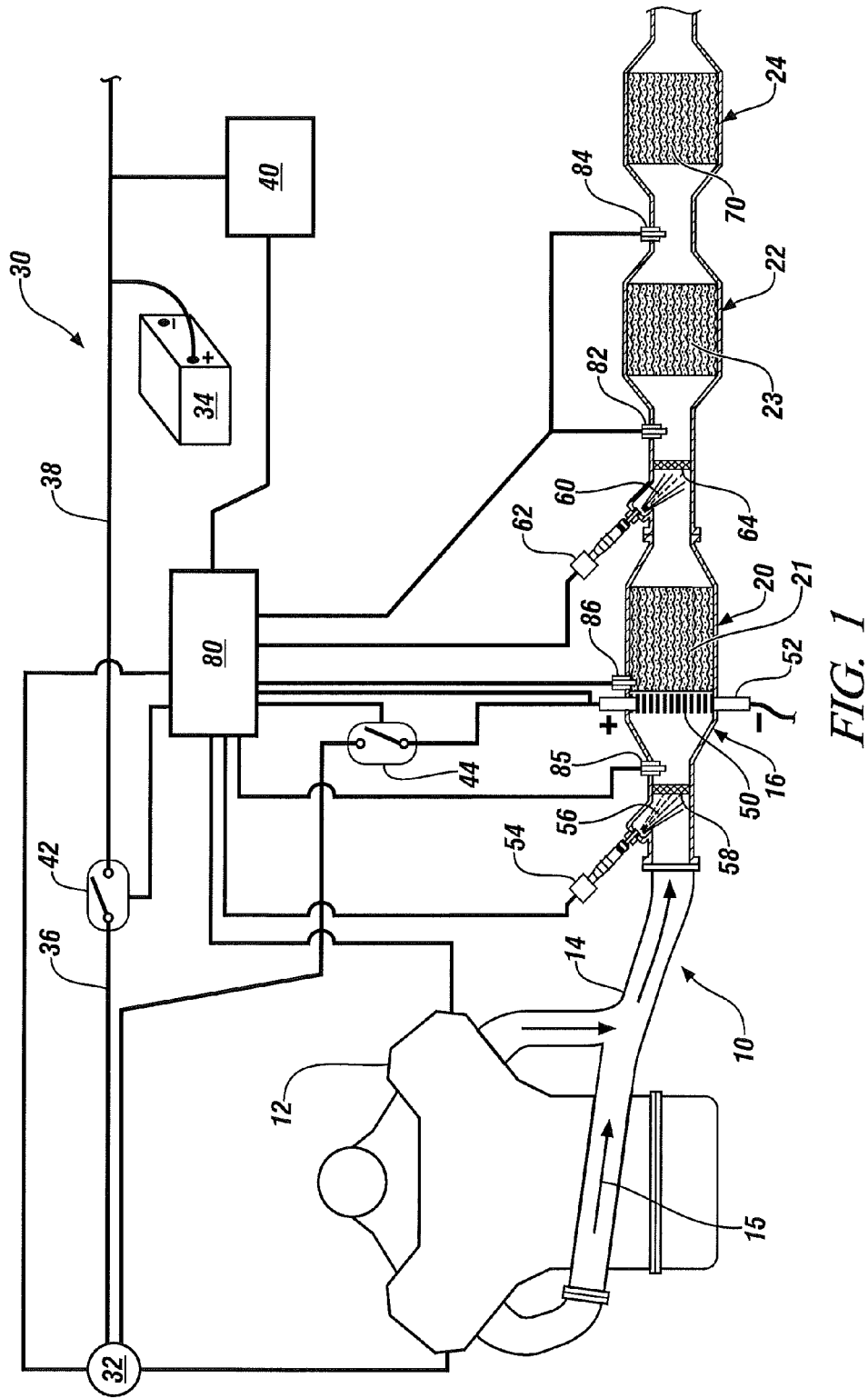
FIG. 1 is a schematic diagram of an exemplary exhaust gas treatment system and electrical system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, or a combinational logic circuit.

Referring now to FIG. 1, an exemplary embodiment is directed to an exhaust gas treatment system 10, for the reduction of regulated exhaust gas constituents of an internal combustion ("IC") engine 12. The exhaust gas treatment system 10 described herein may be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. FIG. 1 illustrates an electrically heated catalyst ("EHC") device 16, an oxidation catalyst ("OC") device 20, a selective catalytic reduction ("SCR") device 22, and a particulate filter ("PF") device 24. As may be appreciated, the exhaust gas treatment system of the present disclosure may include various combinations of one or more of the exhaust treatment devices shown in FIG. 1, and/or other exhaust treatment devices (not shown), and is not limited to the present example. An electrical system 30 is also illustrated, and includes a generator 32, an energy storage device 34, a generator bus 36, a vehicle system bus 38, a vehicle electrical system 40, a vehicle bus switch 42, and an EHC switch 44. The vehicle electrical system 40 may include, for example, interior and exterior lights, various motors (e.g., a blower motor, wiper motor, etc.), heated seats, and other electrical components (not illustrated).

The EHC 16 is disposed upstream of the OC device 20. The EHC device 16 includes a monolith 50 and an electrical heater 52, where the electrical heater 52 is selectively activated and heats the monolith 50. In one embodiment, the electrical heater 52 operates at a voltage of about 12-24 volts and at a power range of about 1-6 kilowatts, however it is understood that other operating conditions may be used as well. The EHC device 16 may be constructed of any suitable material that is electrically conductive such as the wound or stacked metal monolith 50. An oxidation catalyst compound (not shown) may be applied to the monolith 50 as a wash coat and may contain platinum group metals such as platinum (Pt), palladium (Pd), rhodium (Rh) or other suitable oxidizing catalysts, or combination thereof, and may be referred to as the catalyst of the EHC device 16. The catalyst of the EHC device 16 has a respective EHC light-off temperature, which is the temperature at which rapid HC oxidation occurs within the oxidation catalyst compound of the EHC device 16.

The OC device 20 may be located immediately downstream of the EHC device 16 and may include, for example, a flow-through metal or ceramic monolith substrate 21 that may be packaged in a stainless steel shell or canister having an inlet and an outlet in fluid communication with the exhaust gas conduit 14. The substrate 21 may include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC device 20 is useful in treating unburned gaseous and non-volatile HC and CO, which are oxidized to form carbon dioxide and water. The catalyst of the OC device 20 has a respective OC light-off temperature, which is the temperature at which rapid HC oxidation is triggered by the oxidation catalyst compound of the OC device 20.

A hydrocarbon or fuel injector 54 may be located upstream of the EHC device 16 and the OC device 20. The fuel injector 54 is in fluid communication with a source of hydrocarbon (not shown). The fuel injector 54 is used to introduce an unburned hydrocarbon 56 into the exhaust gas 15. A mixer or turbulator 58 may also be disposed within the exhaust conduit 14, in close proximity to the hydrocarbon injector 54, to further assist in thorough mixing of the hydrocarbon 56 with the exhaust gas 15 to create an exhaust gas and hydrocarbon mixture. It is contemplated that, in some circumstances the hydrocarbon injector 54 may be omitted, and the engine 12 may be used to supply hydrocarbon instead of the hydrocarbon injector 54. Specifically, operating parameters of the engine 12 such as, for example, fuel injection timing and quantity, may be adjusted to provide hydrocarbon to the exhaust gas stream 15.

The SCR device 22 may be disposed downstream of the EHC device 16. In a manner similar to the OC device 20, the SCR device 22 may include, for example, a flow-through ceramic or metal monolith substrate 23 that may be packaged in a stainless steel shell or canister having an inlet and an outlet in fluid communication with the exhaust gas conduit 14. The substrate 23 may include an SCR catalyst composition applied thereto. The SCR catalyst composition may contain a zeolite and one or more base metal components such as iron ("Fe"), cobalt ("Co"), copper ("Cu") or vanadium ("V") which may operate efficiently to convert $NO_x$ constituents in the exhaust gas in the presence of a reductant such as ammonia ("$NH_3$"). Specifically, a catalyst composition of the SCR device 22 needs to reach a respective SCR light-off temperature to effectively reduce the $NO_x$ to nitrogen. Once the SCR device 22 attains the SCR light-off temperature, the $NO_x$ is reduced to nitrogen in the presence of the SCR catalyst composition.

A reductant 60 may be supplied from a reductant supply source (not shown) and may be injected into the exhaust gas conduit 14 at a location upstream of the SCR device 22 using a reductant injector 62, or other suitable method of delivery of the reductant 60 to the exhaust gas 15. In one embodiment, the reductant 60 may be an aqueous urea solution that decomposes to ammonia ("$NH_3$") in the hot exhaust gases and is absorbed by the SCR device 22. The ammonia then reduces the $NO_x$ to nitrogen in the presence of the SCR catalyst. A mixer or turbulator 64 may also be disposed within the exhaust conduit 14 in close proximity to the injector 62 to further assist in thorough mixing of the reductant 60 with the exhaust gas 15.

The PF device 24 may be disposed downstream of the OC device 20 and the SCR device 22. The PF device 24 operates to filter the exhaust gas 15 of carbon and other particulates. In various embodiments, the PF device 24 may be constructed using a ceramic wall flow monolith filter 70. The filter 70 may be packaged in a shell or canister that is, for example, stainless steel, and that has an inlet and an outlet in fluid communication with exhaust gas conduit 14.

The filter 70 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 70 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the engine 12. It is appreciated that the ceramic wall flow monolith filter is merely exemplary in nature and that the PF device 24 may include other filter devices such as wound or packed fiber filters, open cell foams, sintered metal fibers, etc.

The electrical system 30 will now be described. The electrical system includes the vehicle bus switch 42 and the EHC switch 44. The vehicle bus switch 42 selectively connects the generator 32 to the vehicle system bus 38. The EHC switch 44 selectively connects the heater 52 of the EHC device 16 with the generator 32. In the embodiment as shown in FIG. 1, the vehicle bus switch 42 and the EHC switch 44 are both single-pole single-throw switches, however it is to be understood that any type of switching element such as, for example, a mechanical switch actuated by a mechanical element (e.g., a rotating cam), relays, or transistors may be used.

The primary energy storage device 34 may be a vehicle battery such as, for example, a lead acid battery. Although a lead acid battery is discussed, it is to be understood that other types of energy storage devices may be used as well. The primary energy storage device 34 may be used to provide electrical power to the vehicle electrical system 40.

The generator 32 is part of the engine 12, and converts mechanical power from the engine 12 into electrical power needed for various vehicle electrical loads. The generator 32 is coupled to a drivetrain (not illustrated) of a vehicle (not illustrated). During an unfueled braking event, a brake pedal (not illustrated) is pressed by a driver, and fueling to the engine 12 is temporarily stopped. Deceleration energy created by the drivetrain is used to turn the generator 32 to produce electrical energy during the unfueled braking event. The generator 32 may be used to provide electrical energy to the electrical heater 52 of the EHC device 16, and to charge the energy storage device 34.

The generator 32 may operate at one of three modes of operation when coupled to the drivetrain during the unfueled braking event. The three modes of operation are a regulated voltage control ("RVC") mode, an elevated voltage mode, and a targeted voltage mode. In RVC mode, operation of the generator 32 is regulated based on a temperature and a state of charge ("SOC") of the energy storage device 34. In the elevated voltage mode, the generator 32 is operated to supply an increased or elevated voltage to the electrical heater 52 of the EHC device 16, which in turn heats the catalyst of the EHC device 16 relatively quickly to the EHC light-off temperature. In the elevated voltage mode, the vehicle bus switch 42 is opened to disconnect the generator 32 from the energy storage device 34. In one exemplary embodiment, the elevated voltage supplied to the electrical heater 52 is about 24 Volts. In the targeted voltage mode, the generator 32 is operated to supply a target voltage to the electrical heater 52 of the EHC device 16. The target voltage represents the voltage needed by the heater 52 in order to maintain the catalyst of the EHC device 16 at a catalyst temperature. The catalyst temperature represents a temperature required to sustain combustion of hydrocarbons in the exhaust gas 14 by the catalyst of the EHC device 16, which is referred to as catalytic combustion. Specifically, catalytic combustion occurs when the hydrocarbons in the exhaust gas 15 react with the activated catalyst of the EHC device 16, and is described in greater detail below.

A control module 80, such as electronic control unit ("ECU"), is operably connected to and monitors the engine 12, the exhaust gas treatment system 10, and the electrical system 30. Specifically, FIG. 1 illustrates the control module 80 operably connected to the engine 12, the EHC device 16, the generator 32, the vehicle electrical system 40, the vehicle bus switch 42, the EHC switch 44, the hydrocarbon injector 54, the reductant injector 60. The control module 80 is also in communication with multiple temperature sensors located in the exhaust gas conduit 14. Specifically, the control module 80 is in communication with a first temperature sensor 82 situated upstream of the SCR device 22 and a second temperature sensor 84 located downstream of the SCR device 22. The control module 80 includes control logic for calculating a temperature profile of the SCR device 22 based on temperatures indicted by the first temperature sensor 82 and the second temperature sensor 84.

The control module 80 is in communication with a temperature sensor 85 located upstream of the monolith 50 of the EHC device 16, and a temperature sensor 86 located downstream of the monolith 50 of the EHC device 16. The temperature sensor 85 is indicative of a temperature of the exhaust gas 15 immediately before the EHC device 16. The temperature sensor 86 is indicative of a temperature of the EHC device 16. In an alternative approach, the temperature sensor 86 is omitted, and instead the control module 50 includes control logic for determining the temperature of the EHC device 16 based on operating parameters of the exhaust gas treatment system 10. Specifically, the temperature of the EHC device 16 may be calculated based on the exhaust flow of the engine 12, an input gas temperature of the engine 12, and the electrical power provided to the electrical heater 52.

The generator 32 is normally operated in RVC mode, where operation of the generator 32 is regulated based on a temperature and the SOC of the energy storage device 34. However, the control module 80 may switch operation of the generator 32 to either the target voltage mode or the elevated voltage mode based on the temperature of the EHC device 16 and the temperature profile of the SCR device 22.

The control module 80 includes control logic for monitoring the temperature of the EHC device 16 (e.g., either by the temperature sensor 86 or by operating parameters of the exhaust gas treatment system 10) to determine if the catalyst of the EHC device 16 is below or above the EHC light-off temperature. If the catalyst temperature of the EHC device 16 is below the EHC light-off temperature, the control module 80 opens the vehicle bus switch 42, thereby disconnecting the generator 32 from the energy storage device 34. The EHC switch 44 is in the closed position. If the generator 32 is disconnected from the battery 34, operation of the generator 32 is switched from the RVC mode to the elevated voltage mode. In the elevated voltage mode, the generator 32 supplies the elevated voltage to the electrical heater 52 of the EHC device 16, which in turn heats the catalyst of the EHC device 16 to the EHC light-off temperature relatively quickly. Once the catalyst of the EHC device 16 reaches the EHC light-off temperature, the control module 80 switches the vehicle bus switch 42 back to the closed position.

If the catalyst temperature of the EHC device 16 is above the EHC light-off temperature, the control module 80 may then monitor the temperature profile of the SCR device 22 based on temperatures indicted by the first temperature sensor 82 and the second temperature sensor 84. If the temperature profile of the SCR device 22 is above the SCR light-off temperature, the control module 80 opens the EHC switch 44 to disconnect the generator 32 from the heater 52 of the EHC device 16.

If the temperature profile of the SCR device 22 is below the SCR light-off temperature, the control module 80 may operate the generator 32 in the target voltage mode. In the target voltage mode, the vehicle bus switch 42 and the EHC switch 44 are both in the closed position, and the generator 32 provides the target voltage to the electrical heater 52 of the EHC device 16. The target voltage represents the voltage required by the heater 52 in order to maintain the catalyst of the EHC device 16 at the catalyst temperature required to sustain catalytic combustion of hydrocarbons introduced into the exhaust gas 15 (by the fuel injector 54 or the engine 12). Specifically, if the generator 32 outputs the target voltage to the heater 52 of the EHC device 16, the control module 80 may then activate the hydrocarbon supply (e.g., either the engine 12 or the fuel injector 54) to introduce hydrocarbons into the exhaust gas 15. Catalytic combustion occurs when the hydrocarbons in the exhaust gas 15 react with the activated catalyst of the EHC device 16 to create an exothermic reaction. The exothermic reaction generates heat that travels downstream in the exhaust gas conduit 14, and heats the SCR device 22 to the SCR light-off temperature.

In one embodiment, the OC device 20 is positioned immediately downstream of the EHC device 16 such that the hydrocarbons in the exhaust gas 14 also react with the activated catalyst of the OC device 20, and creates an exothermic reaction. The exothermic reaction created by the activated catalyst of the OC device 20 also generates heat that travels downstream in the exhaust gas conduit 14 to heat the SCR device 22 to the SCR light-off temperature.

It should be noted that introducing hydrocarbons in the exhaust gas 15 may in turn reduce the temperature of the catalyst of the EHC device 16 (i.e., the hydrocarbons introduced on the monolith 50 of the EHC device 16 vaporize and cool the catalyst of the EHC device 16). Thus, the control module 80 continuously monitors and controls an output voltage of the generator 32 while operating in the target voltage mode. Specifically, the control module 80 monitors and controls the generator 32 based on various parameters of the exhaust gas treatment system 10 to ensure the generator 32 continues to produce the target voltage needed to maintain the catalyst of the EHC device 16 at the catalyst temperature. In one embodiment, the various parameters of the exhaust gas treatment system 10 monitored by the control module 80 include the temperature of the EHC device 16, the temperature of the exhaust gas 15 immediately before the EHC device 16 (measured by temperature sensor 85), an exhaust flow, and a fuel mass flow. The exhaust flow of the engine 12 is calculated by adding an intake air mass of the engine 12 and the fuel mass flow of the engine 12 together. The fuel mass flow is determined by summing the total amount of fuel injected into the engine 12 over a given period of time.

In one embodiment, if the generator 32 is unable to output the target voltage to the electric heater 52, then the control module 80 may operate the vehicle electrical system 40 in a load management mode. Load management mode reduces the electrical power consumed by the vehicle electrical system 40, which allows the generator 32 to produce the target voltage that is supplied to the electrical heater 52. During load management mode, low priority electrical loads of the vehicle electrical system 40 may be shut off for a relatively short period of time (e.g., generally a few seconds) to reduce the electrical power consumed by the vehicle electrical system 40. The low priority loads are electrical systems that may be shut off for a relatively short period of time without a user typically noticing the loss in power (e.g., heated seats).

The control module 80 may continue to monitor the temperature profile of the SCR device 22 (by the first temperature sensor 82 and the second temperature sensor 84) while the generator 32 operates in the target voltage mode. Once the SCR device 22 reaches the SCR light-off temperature, the control module 80 deactivates the hydrocarbon supply (e.g., either the fuel injector 54 or the engine 12), and the control module 80 may switch the generator 32 out of the target voltage mode and back to RVC mode.

The exhaust gas treatment system 10 as described above provides an approach to heat the SCR device 22 to the SCR light-off temperature, without significantly reducing the life of the energy storage device 34. Specifically, the energy storage device 34 is typically disconnected from the generator 32 only for a relatively short period of time (i.e., during the elevated voltage mode), which limits the amount of energy discharge of the energy storage device 34. Once the EHC device 16 attains the EHC light-off temperature, the generator 32 is re-connected to the energy storage device 32, and the generator 32 is operated in target voltage mode. In the target voltage mode, the generator 32 outputs the target voltage to the electrical heater 52 of the EHC device 16, which maintains the catalyst of the EHC device 16 at temperature needed to sustain needed to sustain catalytic combustion of hydrocarbons introduced into the exhaust gas 15 (by the fuel injector 54 or the engine 12). The exothermic reaction created by catalytic combustion generates heat that is used to heat the SCR device 22 to the SCR light-off temperature.

Figure 2:
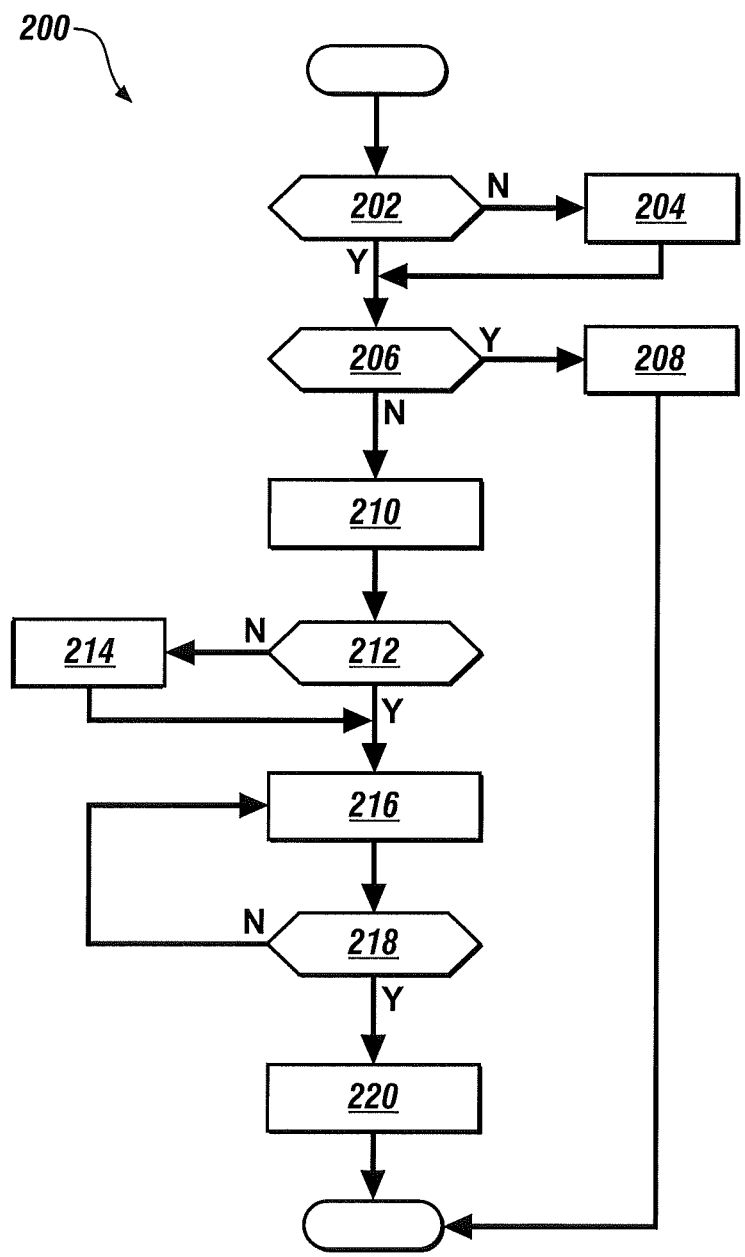
FIG. 2 is a process flow diagram illustrating a method of operating the exhaust gas treatment system and electrical system shown in FIG. 1.

A method of operating the exhaust gas treatment system 10 will now be explained. Referring to FIG. 2, an exemplary process flow diagram illustrating an exemplary method to heat the SCR device 22 to the SCR light-off temperature is generally indicated by reference number 200. It should be noted the method 200 begins with the generator 32 operating in RVC mode (e.g., the vehicle bus switch 42 and the EHC switch 44 are both closed).

Referring generally to FIGS. 1-2, method 200 begins at step 202, where the control module 80 monitors the temperature of the EHC device 16. If the EHC device 16 is below the respective EHC light-off temperature, method 200 may then proceed to step 204. However, if the EHC device 16 is above the respective EHC light-off temperature, method 200 may then proceed to step 206.

In step 204, the generator 32 is disconnected from the energy storage device 34 (e.g., the vehicle bus switch 42 is opened). Operation of the generator 32 is switched from RVC mode to the elevated voltage mode. In elevated voltage mode the generator 32 supplies the elevated voltage to the electrical heater 52 of the EHC device 16, which in turn heats the catalyst of the EHC device 16 to the EHC light-off temperature. Once the EHC device 16 reaches the EHC light-off temperature, method 200 may then proceed to step 206.

In step 206, the control module 80 monitors the temperature profile of the SCR device 22 based on temperatures indicted by the first temperature sensor 82 and the second temperature sensor 84. If the temperature profile of the SCR device 22 is above the SCR light-off temperature, method 200 may then proceed to step 208. In step 208, the control module 80 may then open the EHC switch 44 to disconnect the generator 32 from the heater 52 of the EHC device 16. Method 200 may then terminate. However, if the temperature profile of the SCR device 22 is below the SCR light-off temperature, method 200 may then proceed to step 210.

In step 210, the control module 80 operates the generator 32 in the target voltage mode. In target voltage mode, the control module 80 controls the generator 32 to output the target voltage to the electrical heater 52 of the EHC device 16. Method 200 may then proceed to step 212.

In step 212, the control module 80 determines if the generator 32 is supplying the target voltage to the heater 52 of the EHC device 16. If the answer is no, method 200 may then proceed to step 214. If the answer is yes, method 200 may then proceed to step 216. In step 214, the control module 80 operates the vehicle electrical system 40 in a load management mode. During load management mode, low priority electrical loads may be shut off for a relatively short period of time in order to allow the generator 32 to supply the target voltage to the electric heater 52. Once the generator 32 supplies the target voltage to the heater 52 of the EHC device 16, method 200 may then proceed to step 216.

In step 216, the control module 80 activates the hydrocarbon supply to introduce hydrocarbons into the exhaust gas 15. The hydrocarbon supply may be the engine 12 or the fuel injector 54. Catalytic combustion occurs when the hydrocarbons in the exhaust gas 15 react with the activated catalyst of the EHC device 16, and create the exothermic reaction that generates heat. The exothermic reaction created by catalytic combustion generates heat that is used to heat the SCR device 22 to the SCR light-off temperature. Method 200 may then proceed to step 218.

In step 218, the control module 80 determines if the SCR device 22 has attained the respective SCR light-off temperature. If the SCR device 22 has not reached the SCR light-off temperature, method 200 may return to step 216, where the hydrocarbon supply remains activated. However, if the SCR device 22 has reached the SCR light-off temperature, method 200 may then proceed to step 220.

In step 220, the control module 80 deactivates the hydrocarbon supply (e.g., either the fuel injector 54 or the engine 12), and the control module 80 may switch the generator 32 out of the elevated voltage mode and back to RVC mode. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from the internal combustion engine;
    an electrically heated catalyst ("EHC") device in fluid communication with the exhaust gas conduit, the EHC device including an electric heater and an EHC that is heated to an EHC light-off temperature;
    a generator selectively operable in a target voltage mode to supply a target voltage to the electric heater, wherein the target voltage represents a voltage required by the electric heater in order to maintain the EHC at a catalyst temperature;
    a selective catalytic reduction ("SCR") device in fluid communication with the exhaust gas conduit, wherein the SCR device includes an SCR catalyst that is selectively heated by the EHC device to a SCR light-off temperature;
    a hydrocarbon supply selectively activated to introduce hydrocarbons into the exhaust gas conduit; and
    an electronic control unit ("ECU") in communication with the generator, the EHC device, the hydrocarbon supply, and at least one temperature sensor of the SCR device, the ECU configured to:
        determine an SCR temperature of the SCR catalyst;
        determine whether the EHC is above the EHC light-off temperature and whether the SCR catalyst is below the SCR light off temperature; and
        operate the generator in the target voltage mode based on determining that the EHC is above the EHC light-off temperature and the SCR catalyst is below the SCR light off temperature, wherein operating the generator in the target voltage mode comprises continuously monitoring one or more parameters of the exhaust gas treatment system and continuously controlling an output voltage of the generator based on the one or more parameters so as to responsively adjusting adjust the target voltage to maintain the catalyst temperature based the SCR temperature,
    wherein the catalyst temperature represents a temperature required by the EHC to sustain combustion of the hydrocarbons introduced into the exhaust gas conduit and sustain the SCR light-off temperature of the SCR catalyst so as to improve conversion efficiency of the SCR catalyst.

2. The exhaust gas treatment system of claim 1, wherein the ECU activates the hydrocarbon supply to introduce hydrocarbons into the exhaust gas conduit if the target voltage is provided to the electric heater by the generator.

3. The exhaust gas treatment system of claim 1, further comprising an energy storage device that is selectively connected to the generator by a vehicle bus switch.

4. The exhaust gas treatment system of claim 3, wherein the generator is connected to the energy storage device if the generator is operated at the target voltage mode.

5. The exhaust gas treatment system of claim 1, wherein the ECU is further configured to operate the generator at an elevated voltage mode if the EHC is below the EHC light-off temperature.

6. The exhaust gas treatment system of claim 1, wherein the ECU determines the target voltage based on a temperature of the EHC, an exhaust flow, a temperature of the exhaust gas, and a fuel mass flow.

7. The exhaust gas treatment system of claim 1, further comprising an oxidation catalyst ("OC") located immediately downstream of the EHC device.

8. The exhaust gas treatment system of claim 1, wherein the electric heater is selectively connected to the generator by an EHC switch.

9. The exhaust gas treatment system of claim 8, wherein the ECU is in communication with the EHC switch, and wherein the ECU opens the EHC switch to disconnect the electric heater from the generator if the EHC is above the EHC light-off temperature.

10. A method of operating an exhaust gas treatment system, comprising:
    monitoring an electrically heated catalyst ("EHC") device by an ECU to determine if an EHC is heated to an EHC light-off temperature, wherein the EHC device is in fluid communication with an exhaust gas conduit;
    monitoring a selective catalytic reduction ("SCR") device by the ECU so as to determine a SCR temperature of SCR catalyst included in the SCR device and to determine if the SCR catalyst is at a SCR light-off temperature, wherein the SCR device is located downstream of the EHC device;
    determining whether the EHC is above the EHC light-off temperature and whether the SCR catalyst is below the SCR light off temperature by the ECU;
    providing a hydrocarbon supply selectively activated to introduce hydrocarbons into the exhaust gas conduit, wherein the ECU is in communication with the hydrocarbon supply; and
    based on determining the EHC is above the EHC light-off temperature and the SCR catalyst is below the SCR light off temperature, controlling a generator to operate in a target voltage mode to control the temperature of the EHC, wherein the target voltage represents a voltage required by an electric heater in order to maintain the EHC at a catalyst temperature, wherein operating the generator in the target voltage mode comprises continuously monitoring one or more parameters of the exhaust gas treatment system and continuously controlling an output voltage of the generator based on the one or more parameters so as to responsively adjusting adjust the target voltage to maintain the catalyst temperature based on the SCR temperature,
    wherein the catalyst temperature represents a temperature required by the EHC to sustain combustion of the hydrocarbons introduced into the exhaust gas conduit and sustain the SCR light-off temperature of the SCR catalyst so as to improve conversion efficiency of the SCR catalyst.

11. The method of claim 10, further comprising activating the hydrocarbon supply to introduce hydrocarbons into the exhaust gas conduit if the target voltage is supplied to the electric heater by the generator.

12. The method of claim 10, further comprising providing an energy storage device that is selectively connected to the generator by a vehicle bus switch.

13. The method of claim 12, wherein the generator is connected to the energy storage device if the generator is operated at the target voltage mode.

14. The method of claim 10, wherein the ECU is further configured to operate the generator at an elevated voltage mode if the EHC is below the EHC light-off temperature.

15. The method of claim 10, wherein the ECU determines the target voltage based on a temperature of the EHC, an exhaust flow, a temperature of an exhaust gas, and a fuel mass flow.

16. The method of claim 10, further comprising providing an oxidation catalyst ("OC") that is located immediately downstream of the EHC device.

\* \* \* \* \*